Mar. 13, 1923.

V. R. MELVILLE

NONBURSTING RADIATOR TUBE

Filed May 27, 1920

1,448,075

Inventor
Victor R. Melville

By

Attorneys

Patented Mar. 13, 1923.

1,448,075

UNITED STATES PATENT OFFICE.

VICTOR R. MELVILLE, OF LA GRANDE, OREGON.

NONBURSTING RADIATOR TUBE.

Application filed May 27, 1920. Serial No. 384,685.

*To all whom it may concern:*

Be it known that I, VICTOR R. MELVILLE, a citizen of the United States, residing at La Grande, in the county of Union, State of Oregon, have invented certain new and useful Improvements in Nonbursting Radiator Tubes; and I do hereby declare the following to be a full, clear, and exact description of the invention, such as will enable others skilled in the art to which it appertains to make and use the same.

This invention relates to new and useful improvements in water pipes and particularly to radiator pipes.

The principal object of the invention is to provide a pipe of the character named which will not be subject to bursting when the water therein becomes frozen.

Another object is to provide a novel and improved pipe of this character which will readily radiate heat, and which will easily and quickly expand under the influence of the pressure of ice formed therein by freezing.

Other objects and advantages will be apparent from the following description when taken in connection with the accompanying drawing.

The vertical pipes used in automobile radiators are generally circular or elliptical in cross section, and when the water freezes in such pipes the expansion is too great for the pipes, with the result that the pipes burst. This is annoying, as well as expensive, as the pipes must be repaired or replaced. It is the particular object of the present invention to provide a radiator pipe which will readily expand with the pressure exerted by the freezing or frozen water therein, and whereby the pipe will be prevented from bursting. The particular manner in which this is accomplished is to form the pipe with a central passage whose diameter is practically that of the ordinary pipe of this character, but with longitudinal ribs or corrugations, which provide an excess of metal which will permit quick expansion under outward pressure from within the pipe. By this construction the pipe is prevented from bursting, and the life of the pipe greatly prolonged.

Referring particularly to the accompanying drawing, there is shown a radiator equipped with the pipes, the radiator being represented by the numeral 10 and the pipes by the numeral 11. Each of the pipes is formed with a plurality of longitudinal corrugations 12, extending throughout the entire length of the pipe, so that the expansive action from within will be taken up by the pipe at all points along its length. Heretofore, pipes which have been provided with corrugations, had such corrugations terminating short of the ends of the pipe, with the result that the ends of the pipe were subject to bursting from the expansion from within. By producing the corrugations through both ends of the pipe, the expansive action of the water within will be taken up throughout the length of the pipe. Furthermore, the ribs of the corrugations form radiating fins, which will serve to give off excessive heat.

Figure 1:
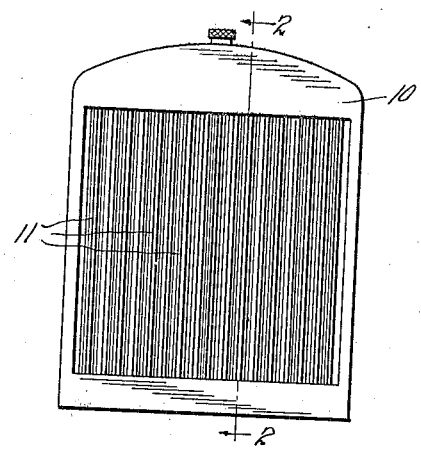
Figure 1 is an elevation of a radiator equipped with pipes made in accordance with the invention.
Figure 3:
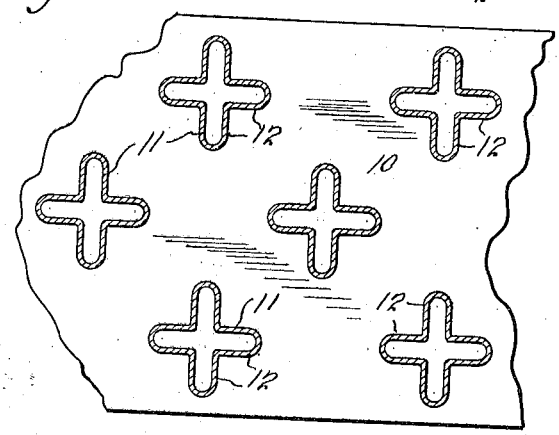
Figure 3 is a horizontal section on the line 3—3 of Figure 2, through a number of the pipes.
Figure 2:
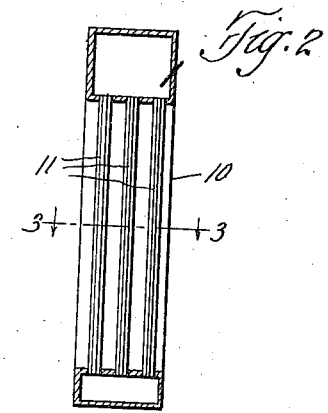
Figure 2 is a vertical longitudinal central section on the line 2—2 of Figure 1.
Figure 5:
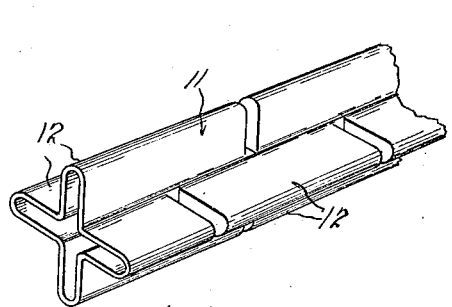
Figure 5 is a perspective view of a modification in which the pipe has broken lengths of longitudinal corrugations.
Figure 4:
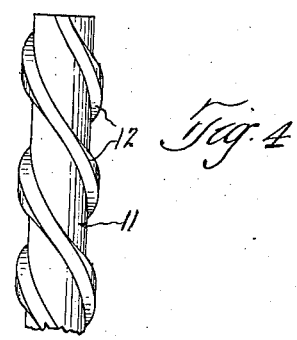
Figure 4 is an elevation of a modification in which the pipe has spiral corrugations.

The corrugations may extend straight and continuously throughout the length of the pipe, or they may be formed in sections, as shown in Figure 4. If desired, the corrugations may be formed spirally on the pipe, as shown in Figure 5. However, they are formed, they must extend through the ends of the pipe to produce the desired and effective result.

What is claimed is:

A radiator tube consisting of a hollow body cruciformed in cross section, each of the arms of the cruciform being divided into longitudinal sections arranged in staggered relation to those of the other arms and being closed at their ends.

In testimony whereof, I affix my signature, in the presence of two witnesses.

VICTOR R. MELVILLE.

Witnesses:
 JNO. S. HODGIN,
 WM. E. HARRIS.